United States Patent
Carnevali

(10) Patent No.: US 11,635,155 B2
(45) Date of Patent: Apr. 25, 2023

(54) ADAPTER FOR ATTACHMENT TO A TRACK OR OTHER SURFACE OR FOR RECEIVING DEVICES HAVING DIFFERENT SHAFT SPLINE ARRANGEMENTS

(71) Applicant: National Products, Inc., Seattle, WA (US)

(72) Inventor: Jeffrey D. Carnevali, Seattle, WA (US)

(73) Assignee: National Products, Inc., Seattle, WA (US)

( * ) Notice: Subject to any disclaimer, the term of this patent is extended or adjusted under 35 U.S.C. 154(b) by 364 days.

(21) Appl. No.: 16/870,464

(22) Filed: May 8, 2020

(65) Prior Publication Data
US 2021/0348700 A1 Nov. 11, 2021

(51) Int. Cl.
*F16L 3/24* (2006.01)
*F16M 11/04* (2006.01)
*F16M 13/02* (2006.01)
*F16M 11/18* (2006.01)

(52) U.S. Cl.
CPC .............. *F16L 3/24* (2013.01); *F16M 11/041* (2013.01); *F16M 11/043* (2013.01); *F16M 11/18* (2013.01); *F16M 13/022* (2013.01); *F16M 2200/024* (2013.01)

(58) Field of Classification Search
USPC .............. 248/223.41, 224.51, 224.7, 224.61, 248/225.11, 519, 523, 524, 527, 511
See application file for complete search history.

(56) References Cited

U.S. PATENT DOCUMENTS

| | | | |
|---|---|---|---|
| 180,881 A | 8/1876 | Howson |
| 538,534 A | 4/1895 | Neill |
| 596,729 A | 1/1898 | White |
| 842,007 A | 1/1907 | Parker |
| 855,149 A | 5/1907 | Vaughn et al. |
| 890,656 A | 6/1908 | Johnson |
| 892,105 A | 6/1908 | White |
| 958,052 A | 5/1910 | Williams |

(Continued)

OTHER PUBLICATIONS

Yakattack.us, 4 pages of product description of GT175 retrieved from web site at: www.yakattack.us/geartrac/gt175/.

(Continued)

*Primary Examiner* — Alfred J Wujciak
(74) *Attorney, Agent, or Firm* — Branch Partners PLLC; Bruce E. Black

(57) ABSTRACT

An adapter includes a housing and a shaft receiving port defined in the housing. The shaft receiving port defines grooves extending at least partway along the shaft receiving port. The grooves include a set of first grooves and a set of second grooves, where at least one of the first grooves is different from at least one of the second grooves. Another adapter for coupling a device to a track includes a housing defining a threaded port and a shaft receiving port; a track retention arrangement including a foot and a threaded post extending from the foot, where the threaded post is rotatably engaged with the threaded port of the housing to raise or lower the foot relative to the housing; and a locking mechanism including an actuator and a plunger coupled to the actuator and configured to extend from the housing into the track channel of the track.

20 Claims, 10 Drawing Sheets

(56) References Cited

U.S. PATENT DOCUMENTS

| | | | |
|---|---|---|---|
| 1,009,913 | A | 11/1911 | Maguire et al. |
| 1,280,013 | A | 9/1918 | Goddard |
| 1,359,645 | A | 11/1920 | Zink |
| 1,455,441 | A | 5/1923 | Hodny |
| 1,509,068 | A | 9/1924 | Herron |
| 1,934,223 | A | 11/1933 | Booth |
| 2,029,089 | A | 1/1936 | Weirauch |
| 2,114,767 | A | 4/1938 | Hodny et al. |
| 2,121,317 | A | 6/1938 | Cohen |
| D142,057 | S | 8/1945 | Baxter |
| 2,560,556 | A | 7/1951 | Creedon |
| 2,650,788 | A | 9/1953 | Hulstein |
| 2,688,504 | A | 9/1954 | Parker |
| 2,710,609 | A | 6/1955 | Giller |
| 2,723,823 | A | 11/1955 | Polk |
| 2,752,173 | A | 6/1956 | Krooss |
| 2,859,710 | A | 11/1958 | Elsner |
| 2,861,501 | A | 11/1958 | Strelakos |
| 3,096,061 | A | 7/1963 | Bertell |
| 3,252,677 | A | 5/1966 | Raymond |
| 3,304,038 | A | 2/1967 | Guthrie |
| 3,588,154 | A * | 6/1971 | Voight ................. F16D 1/04 464/158 |
| 3,605,637 | A | 9/1971 | Prete, Jr. |
| 3,652,050 | A | 3/1972 | Marrujo et al. |
| 3,779,502 | A | 12/1973 | Marberg |
| 3,843,272 | A | 10/1974 | Jorn |
| 3,992,120 | A * | 11/1976 | Recker ................. F16D 1/116 403/322.2 |
| 4,060,241 | A | 11/1977 | Hegel |
| 4,060,331 | A | 11/1977 | Domer et al. |
| 4,066,231 | A | 1/1978 | Bahner |
| 4,066,311 | A | 1/1978 | Poulson |
| D247,420 | S | 3/1978 | Reynolds |
| 4,085,684 | A | 4/1978 | McLennan et al. |
| 4,183,387 | A | 1/1980 | Lenz |
| 4,205,486 | A | 6/1980 | Guarnacci |
| 4,222,680 | A | 9/1980 | Browning |
| 4,225,258 | A | 9/1980 | Thompson |
| 4,307,864 | A | 12/1981 | Benoit |
| 4,461,284 | A | 7/1984 | Fackler |
| 4,491,435 | A | 1/1985 | Meier |
| 4,585,197 | A | 4/1986 | Liautaud et al. |
| 4,611,839 | A | 9/1986 | Rung et al. |
| 4,620,813 | A | 11/1986 | Lacher |
| 4,641,986 | A | 2/1987 | Tsui et al. |
| 4,677,794 | A | 7/1987 | Parron et al. |
| 4,688,843 | A | 8/1987 | Hall |
| 4,796,508 | A | 1/1989 | Hoshino |
| 4,800,795 | A | 1/1989 | Yamashita |
| 4,805,784 | A | 2/1989 | Solheim et al. |
| 4,842,308 | A | 6/1989 | Spotts |
| 4,872,630 | A | 10/1989 | Cooper |
| 4,950,099 | A | 8/1990 | Roellin |
| 5,071,279 | A | 12/1991 | Rustrom |
| 5,092,551 | A | 3/1992 | Meier |
| 5,109,321 | A | 4/1992 | Maglica et al. |
| 5,118,058 | A | 6/1992 | Richter |
| 5,231,785 | A * | 8/1993 | Roberts ................. A01K 97/10 248/538 |
| 5,241,796 | A | 9/1993 | Hellwig et al. |
| 5,251,859 | A | 10/1993 | Cyrell et al. |
| 5,259,711 | A | 11/1993 | Beck |
| 5,270,911 | A | 12/1993 | Maglica et al. |
| 5,284,098 | A | 2/1994 | Klapperich et al. |
| 5,305,700 | A | 4/1994 | Strong et al. |
| 5,419,522 | A | 5/1995 | Luecke et al. |
| 5,441,225 | A | 8/1995 | Hall |
| 5,564,668 | A | 10/1996 | Crowe, II |
| 5,628,597 | A | 5/1997 | Chudoba et al. |
| 5,632,568 | A * | 5/1997 | Fechter ................. F16D 1/116 403/328 |
| 5,727,858 | A | 3/1998 | Shapiro |
| 5,823,724 | A | 10/1998 | Lee |
| 5,845,885 | A | 12/1998 | Carnevali |
| 6,173,926 | B1 | 1/2001 | Elvegaard |
| 6,241,616 | B1 * | 6/2001 | Lightcap ................. F16C 3/03 464/158 |
| 6,308,642 | B1 | 10/2001 | Branam et al. |
| 6,561,476 | B2 | 5/2003 | Carnevali |
| 6,581,892 | B2 | 6/2003 | Carnevali |
| 6,588,722 | B2 | 7/2003 | Eguchi et al. |
| 6,666,420 | B1 | 12/2003 | Carnevali |
| 6,688,568 | B1 | 2/2004 | Moufflet |
| 6,695,183 | B2 | 2/2004 | Hancock et al. |
| 6,789,988 | B1 | 9/2004 | Moradians |
| 6,846,140 | B2 | 1/2005 | Anderson et al. |
| 6,902,089 | B2 | 6/2005 | Carnevali |
| 6,945,414 | B1 | 9/2005 | Stevens et al. |
| 7,090,181 | B2 | 8/2006 | Biba et al. |
| 7,100,808 | B2 | 9/2006 | Hancock et al. |
| 7,159,998 | B2 | 1/2007 | Moreland |
| D539,639 | S | 4/2007 | Nagle |
| 7,277,240 | B2 | 10/2007 | Carnevali |
| 7,320,450 | B2 | 1/2008 | Carnevali |
| D563,781 | S | 3/2008 | Carnevali |
| D564,062 | S | 3/2008 | Carnevali |
| 7,337,934 | B2 | 3/2008 | Alling et al. |
| 7,401,995 | B2 | 7/2008 | Senakiewich, II |
| 7,422,184 | B2 | 9/2008 | Carnevali |
| D588,903 | S | 3/2009 | Carnevali |
| D589,327 | S | 3/2009 | Carnevali |
| D590,696 | S | 4/2009 | Carnevali |
| 7,523,904 | B2 | 4/2009 | Carnevali |
| 7,551,458 | B2 | 6/2009 | Carnevali |
| 7,556,463 | B1 | 7/2009 | Hall |
| 7,571,522 | B2 | 8/2009 | Carnevali |
| 7,607,622 | B2 | 10/2009 | Carnevali |
| 7,682,543 | B2 | 3/2010 | Carnevali |
| 7,731,140 | B2 | 6/2010 | Carnevali |
| 7,757,424 | B2 * | 7/2010 | Follmar ................. A01K 97/10 248/521 |
| 7,774,973 | B2 | 8/2010 | Carnevali |
| D629,080 | S | 12/2010 | Dole et al. |
| 7,849,630 | B2 | 12/2010 | Carnevali |
| 7,850,133 | B2 | 12/2010 | Carnevali |
| 7,854,204 | B2 | 12/2010 | Dacus |
| RE42,060 | E | 1/2011 | Carnevali |
| 7,887,018 | B2 | 2/2011 | Carnevali |
| 7,950,701 | B2 | 5/2011 | Dole et al. |
| 7,954,773 | B2 | 6/2011 | Carnevali |
| 7,975,971 | B2 | 7/2011 | Carnevali |
| 7,980,798 | B1 | 7/2011 | Kuehn et al. |
| RE42,581 | E | 8/2011 | Carnevali |
| 7,988,106 | B2 | 8/2011 | Carnevali |
| 8,020,828 | B2 | 9/2011 | Carnevali |
| 3,037,904 | A1 | 10/2011 | Carnevali |
| 8,156,681 | B2 | 4/2012 | Carnevali |
| 8,201,788 | B2 | 6/2012 | Carnevali |
| 8,235,340 | B2 | 8/2012 | Carnevali |
| RE43,806 | E | 11/2012 | Carnevali |
| 8,322,955 | B2 | 12/2012 | Arnesen et al. |
| 8,408,853 | B2 | 4/2013 | Womack et al. |
| 8,454,178 | B2 | 6/2013 | Carnevali |
| 8,505,861 | B2 | 8/2013 | Carnevali |
| 8,534,519 | B2 | 9/2013 | Hancock et al. |
| 8,590,855 | B2 | 11/2013 | Carnevali |
| 8,651,289 | B2 | 2/2014 | Diaz, Jr. et al. |
| 8,776,698 | B2 | 7/2014 | Pherson |
| 8,944,399 | B2 * | 2/2015 | Sutherland ............. A01K 97/10 248/222.13 |
| 8,992,238 | B2 | 3/2015 | Chinn |
| 9,056,580 | B2 | 6/2015 | Baldsiefen et al. |
| 9,180,925 | B2 | 11/2015 | Carnevali |
| 9,253,970 | B2 | 2/2016 | Carnevali |
| 9,365,150 | B2 | 6/2016 | Baldsiefen et al. |
| 9,379,504 | B2 | 6/2016 | Chinn |
| 9,623,787 | B2 | 4/2017 | Sterling |
| 9,671,060 | B1 | 6/2017 | Cifers |
| 9,828,073 | B1 | 11/2017 | Cifers, III |
| 9,944,217 | B2 | 4/2018 | Schroeder et al. |
| 9,975,466 | B2 | 5/2018 | Hendren et al. |
| 9,987,993 | B2 | 6/2018 | Thorimbert |
| 10,527,219 | B2 | 1/2020 | Carnevali |

(56) References Cited

U.S. PATENT DOCUMENTS

| | | |
|---|---|---|
| 2003/0042282 A1 | 3/2003 | Gates et al. |
| 2003/0185008 A1 | 10/2003 | Moreland |
| 2004/0178309 A1 | 9/2004 | Crowley et al. |
| 2005/0036848 A1 | 2/2005 | Cunningham et al. |
| 2005/0092876 A1 | 5/2005 | Carnevali |
| 2005/0132937 A1 | 6/2005 | Branam |
| 2006/0000957 A1 | 1/2006 | Carnevali |
| 2006/0102823 A1 | 5/2006 | Carnevali |
| 2008/0115344 A1 | 5/2008 | Carnevali |
| 2008/0296334 A1 | 12/2008 | Carnevali |
| 2009/0014584 A1 | 1/2009 | Ruddock et al. |
| 2009/0095206 A1 | 4/2009 | Dacus |
| 2009/0108151 A1 | 4/2009 | Carnevali |
| 2009/0108152 A1 | 4/2009 | Carnevali |
| 2009/0140112 A1 | 6/2009 | Carnevali |
| 2009/0241293 A1 | 10/2009 | Swerdlick |
| 2009/0253521 A1* | 10/2009 | Arden ................. F16D 9/06 464/32 |
| 2010/0282802 A1 | 11/2010 | Carnevali |
| 2010/0284199 A1 | 11/2010 | Carnevali |
| 2010/0288843 A1 | 11/2010 | Arnesen et al. |
| 2011/0097177 A1 | 4/2011 | Carnevali |
| 2012/0006948 A1 | 1/2012 | Hiss et al. |
| 2012/0181409 A1 | 7/2012 | Hayahara et al. |
| 2012/0217353 A1 | 8/2012 | Hennon |
| 2012/0318937 A1 | 12/2012 | Carnevali |
| 2013/0133158 A1 | 5/2013 | Tran |
| 2014/0003878 A1 | 1/2014 | Knox et al. |
| 2014/0034794 A1 | 2/2014 | Carnevali |
| 2014/0226315 A1 | 8/2014 | Nicieja et al. |
| 2014/0248103 A1 | 9/2014 | Baldsiefen et al. |
| 2015/0030386 A1 | 1/2015 | Carnevali |
| 2015/0275942 A1 | 10/2015 | Carnevali |
| 2016/0288691 A1 | 10/2016 | Aubrey et al. |
| 2017/0209318 A1 | 7/2017 | Schroeder et al. |
| 2018/0345476 A1 | 12/2018 | Carnevali |
| 2018/0347749 A1 | 12/2018 | Carnevali |
| 2018/0363842 A1 | 12/2018 | Carnevali |
| 2019/0014767 A1 | 1/2019 | Carnevali |
| 2019/0017651 A1 | 1/2019 | Carnevali |
| 2019/0086028 A1 | 3/2019 | Carnevali |
| 2020/0158281 A1 | 5/2020 | Carnevali |

OTHER PUBLICATIONS

Yakattack.us, 5 pages of product description of GT90 retrieved from web site at: www.yakattack.us/geartrac/gt90/.

Yakattack.us, 6 pages of product description of GTSL90 retrieved from web site at: www.yakattack.us/by-product-name/geartrac/gtsl90/.

Yakattack.us, 4 pages of product description of GTTL retrieved from web site at: www.yakattack.us/geartrac/gttl/.

Yakattack.us, 7 pages of product description of GearTrac retrieved from web site at: www.yakattack.us/by-product-name/geartrac/.

* cited by examiner

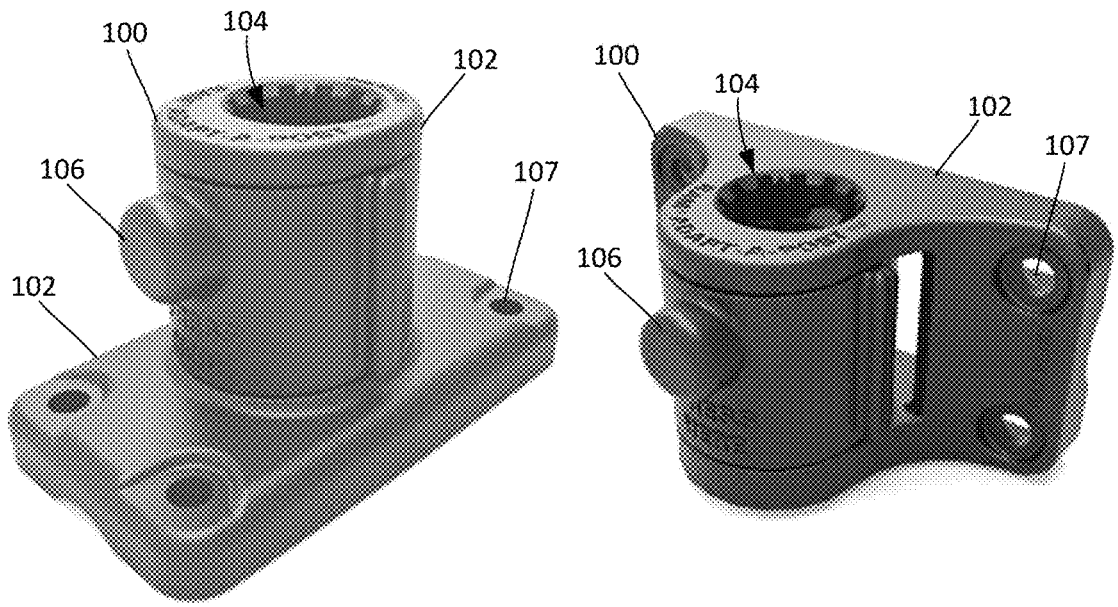
Fig. 1D
Fig. 1E
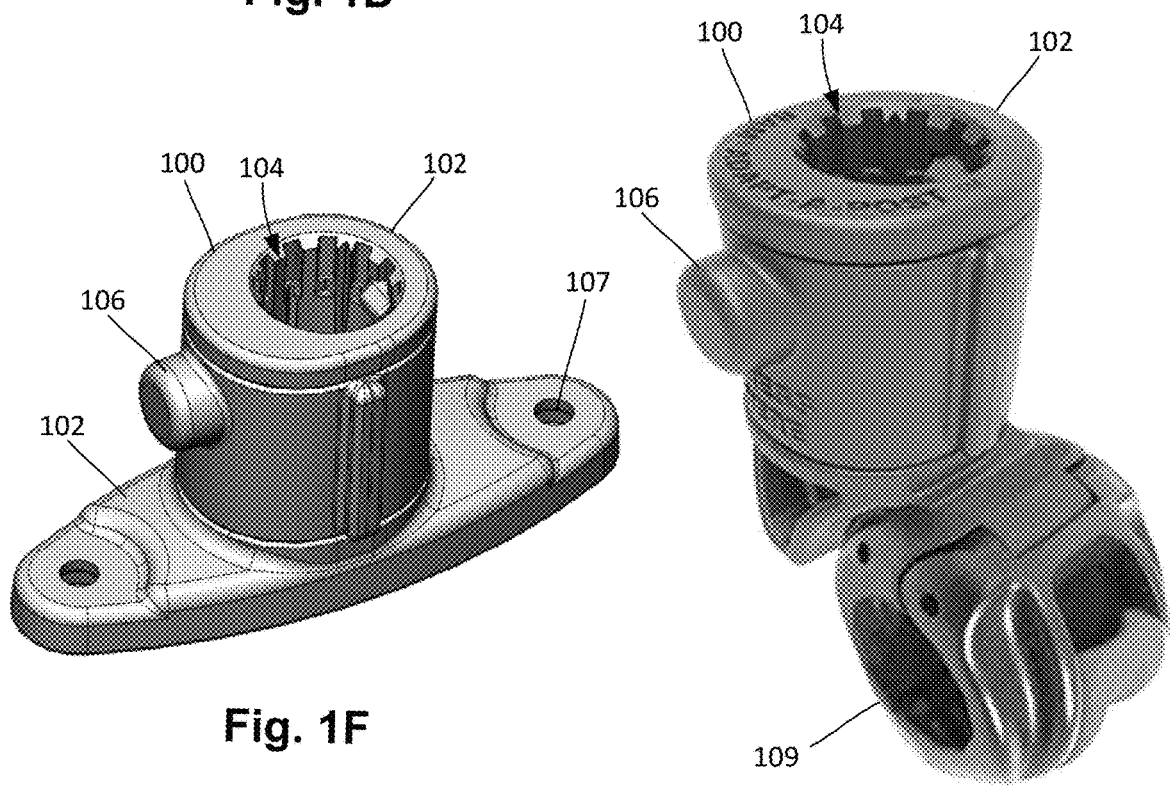
Fig. 1F
Fig. 1G

ADAPTER FOR ATTACHMENT TO A TRACK OR OTHER SURFACE OR FOR RECEIVING DEVICES HAVING DIFFERENT SHAFT SPLINE ARRANGEMENTS

FIELD

The present invention is directed to an adapter for attaching devices to a track. The present invention is also directed to an adapter for attachment of devices having different shaft spline arrangements.

BACKGROUND

Adapters are used to join two items, such as devices, tracks, surfaces, or the like. The adapter may be designed to accommodate a variety of different devices and device configurations.

BRIEF SUMMARY

One embodiment is an adapter that includes a housing and a shaft receiving port defined in the housing and configured to receive a shaft of a device. The shaft receiving port defines a plurality of grooves arranged around the shaft receiving port and extending at least partway along the shaft receiving port. The plurality of grooves includes a set of first grooves and a set of second grooves, where at least one of the first grooves is different from at least one of the second grooves. The first grooves are arranged to receive a first shaft that has a first pattern of splines disposed along the first shaft to fit into the first grooves and the second grooves are arranged to receive a second shaft that has a second pattern of splines along the second shaft to fit into the second grooves.

In at least some embodiments, at least one of the grooves is one of the first grooves and also one of the second grooves. In at least some embodiments, the at least one of the first grooves has a different cross-sectional shape from the at least one of the second grooves. In at least some embodiments, the at least one of the first grooves extends a different distance along the shaft receiving port from the at least one of the second grooves. In at least some embodiments, the number of first grooves is different from the number of second grooves.

In at least some embodiments, at least one of the first grooves has a first cross-sectional shape along a first portion of the least one of the first grooves and a second-cross-sectional shape, different from the first cross-sectional shape, along a second portion of the at least one of the first grooves. In at least some embodiments, at least one of the first grooves includes a first stop partway along a length of the at least one of the first grooves and a second stop at an end of the length of the at least one of the first grooves. In at least some embodiments, the first grooves are disposed uniformly around a circumference of the shaft receiving port.

In at least some embodiments, the adapter further includes a shaft locking mechanism including a lock housing, an actuator defined by the lock housing, and a shaft engagement member defined by the lock housing and configured to be movable using the actuator between a locked position and a disengaged position and to engage the shaft of the device when the shaft is in the shaft receiving port and the shaft locking mechanism is in a locked position. In at least some embodiments, the shaft locking mechanism further comprises a biasing member arranged to bias the shaft locking mechanism in the locked position. In at least some embodiments, the shaft engagement member includes a plurality of arms disposed at different positions along the shaft receiving port. In at least some embodiments, at least two of the arms differ in shape, size, or distance that the respective arm extends into the shaft receiving port when the shaft locking mechanism is in the locked position. In at least some embodiments, at least one of the arms includes a curved surface configured for the shaft to engage the curved surface as the shaft is inserted into the shaft receiving port and push the shaft locking mechanism to a disengaged position to continue insertion of the shaft.

Another embodiment is an adapter for coupling a device to a track. The adapter includes a housing defining a threaded port and a shaft receiving port configured to receive a portion of the device; a track retention arrangement including a foot and a threaded post extending from the foot, wherein the threaded post is rotatably engaged with the threaded port of the housing to raise or lower the foot relative to the housing, wherein the foot is configured for insertion into a track channel of the track and, when rotated, to engage or disengage the track; and a locking mechanism including an actuator and a plunger coupled to the actuator and configured, when deployed by operation of the actuator, to extend from the housing into the track channel of the track to engage a portion of the track channel and hinder rotation of the housing and raising or lowering of the foot of the track retention arrangement.

In at least some embodiments, the locking mechanism further includes a base disposed adjacent the housing and configured to clamp a portion of the track between the base and the foot when the adapter is coupled to the track. In at least some embodiments, the shaft receiving port defines a plurality of grooves arranged around the shaft receiving port and extending at least partway along the shaft receiving port. In at least some embodiments, the plurality of grooves includes a set of first grooves and a set of second grooves, wherein at least one of the first grooves is different from at least one of the second grooves, wherein the first grooves are arranged to receive a first shaft that has a first pattern of splines disposed along the first shaft to fit into the first grooves and the second grooves are arranged to receive a second shaft that has a second pattern of splines along the second shaft to fit into the second grooves.

In at least some embodiments, the adapter further includes a shaft locking mechanism including a lock housing, an actuator defined by the lock housing, and a shaft engagement member defined by the lock housing and configured to be movable using the actuator between a locked position and a disengaged position and to engage the shaft of the device when the shaft is in the shaft receiving port and the shaft locking mechanism is in a locked position. In at least some embodiments, the shaft locking mechanism further comprises a biasing member arranged to bias the shaft locking mechanism in the locked position. In at least some embodiments, the shaft engagement member includes a plurality of arms disposed at different positions along the shaft receiving port. In at least some embodiments, at least two of the arms differ in shape, size, or distance that the respective arm extends into the shaft receiving port when the shaft locking mechanism is in the locked position. In at least some embodiments, at least one of the arms includes a curved surface configured for the shaft to engage the curved surface as the shaft is inserted into the shaft receiving port and push the shaft locking mechanism to a disengaged position to continue insertion of the shaft.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 1A is a schematic perspective view of a first embodiment of an adapter coupled to a track, according to the invention;

FIG. 1D is schematic perspective view of a fourth embodiment of an adapter, according to the invention;

FIG. 1E is schematic perspective view of a fifth embodiment of an adapter, according to the invention;

FIG. 1F is schematic perspective view of a sixth embodiment of an adapter, according to the invention;

FIG. 1G is schematic perspective view of a seventh embodiment of an adapter, according to the invention;

DETAILED DESCRIPTION

The present invention is directed to an adapter for attaching devices to a track. The present invention is also directed to an adapter for attachment of devices having different shaft spline arrangements.

Figure 1B:
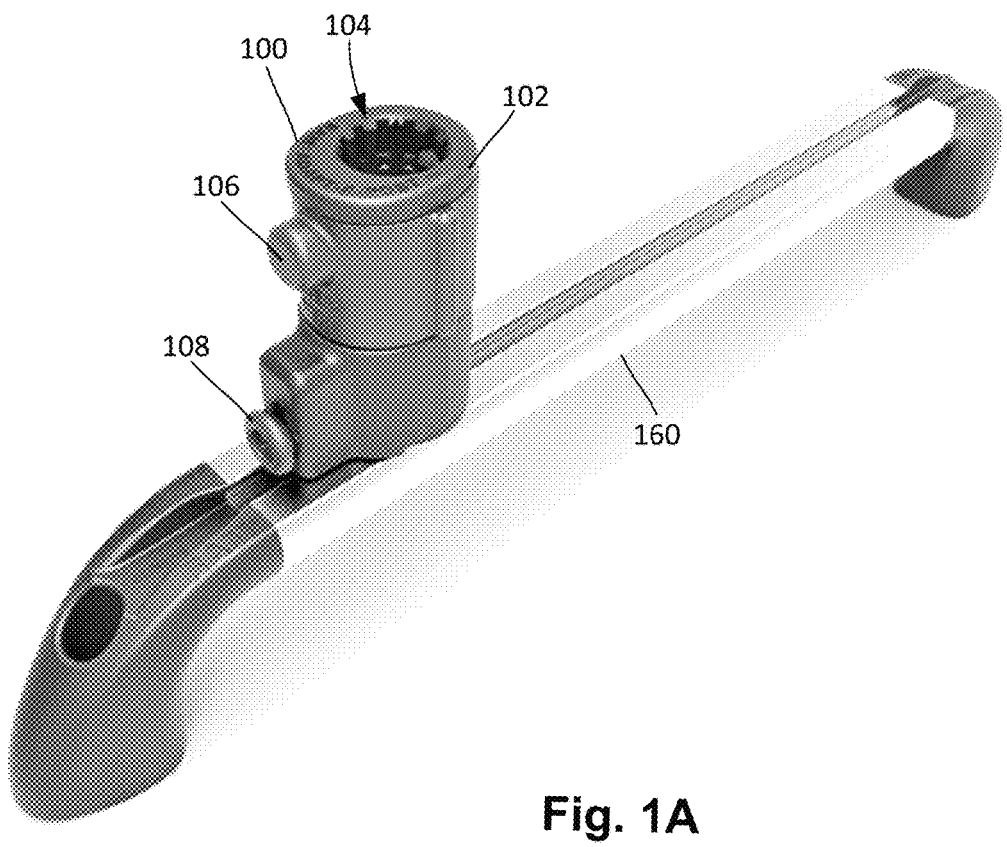
FIG. 1B is schematic perspective view of a second embodiment of an adapter, according to the invention.

FIG. 1A illustrates an adapter 100 for a device which may be useful for coupling the device to a track 160 or other surface, mounting arrangement, apparatus, rod, pole, or the like. The adapter 100 includes a housing 102, a port 104 for receiving a shaft 182 of the device 180 (see, FIG. 2 below for two examples of a shaft of a device), a shaft locking mechanism 106, and a track locking mechanism 108. Examples of other adapters 100 are illustrated in FIGS. 1B to 1G. These embodiments of the adapter 100 also illustrate that one or both of the locking mechanism 106 or the track locking mechanism 108 are optional.

Figure 1B:
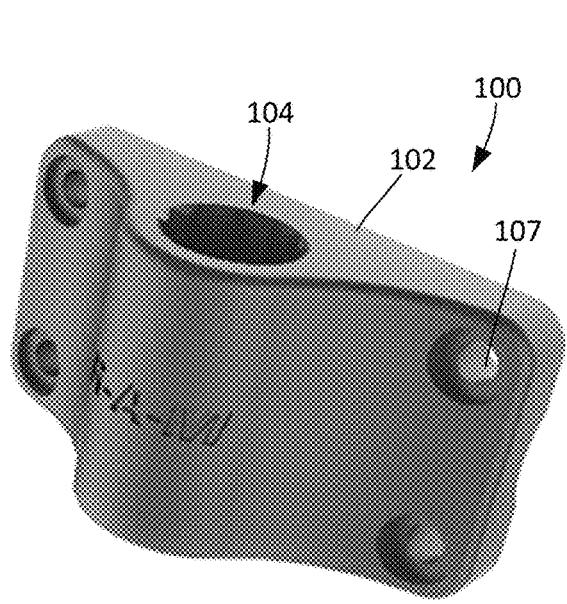
Figure 1C:
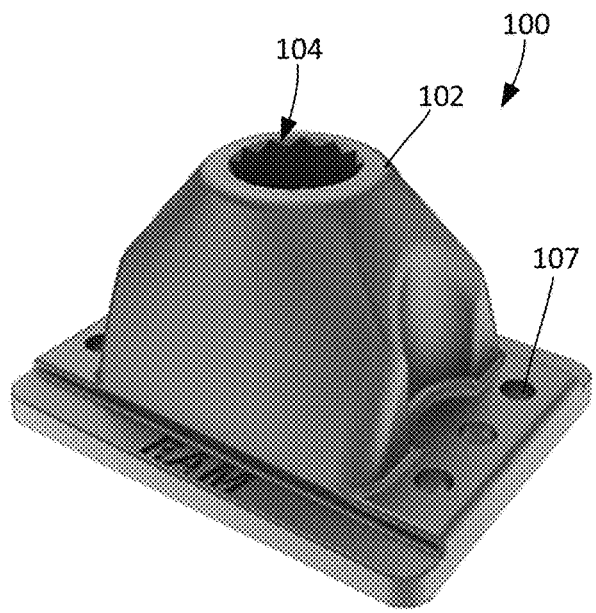
FIG. 1C is schematic perspective view of a third embodiment of an adapter, according to the invention.

Although the adapter 100 of FIG. 1A is described herein for use in coupling a device to a track, it will be understood that the adapter 100 can be used to couple the device to a surface, mounting arrangement, apparatus, rod, pole, or the like. The adapters 100 illustrated in FIGS. 1B to 1F illustrate a housing 102 that can be attached to a surface, mounting arrangement, apparatus, or the like using fasteners (for example, screws, bolts, nails, T-bolts, or the like or any other suitable fastener) that fits through the holes 107. In at least some embodiments, the holes 107 can be threaded. FIG. 1G illustrates an adapter 100 that is attached to a clamp 109 for attachment to a rod, pole, mounting arrangement, apparatus, or the like. FIGS. 1C, 1D, and 1F illustrate an adapter 100 where the shaft 182 (FIG. 2) may extend perpendicular to a surface to which the adapter is attached. FIGS. 1B and 1E illustrate an adapter 100 where the shaft 182 (FIG. 2) may extend parallel to the surface to which the adapter is attached. FIG. 1G illustrates an adapter 100 that can be coupled to a rod or pole or the like where the orientation of the shaft 182 (FIG. 2) may be adjustable relative to the rod or pole.

Figure 2:
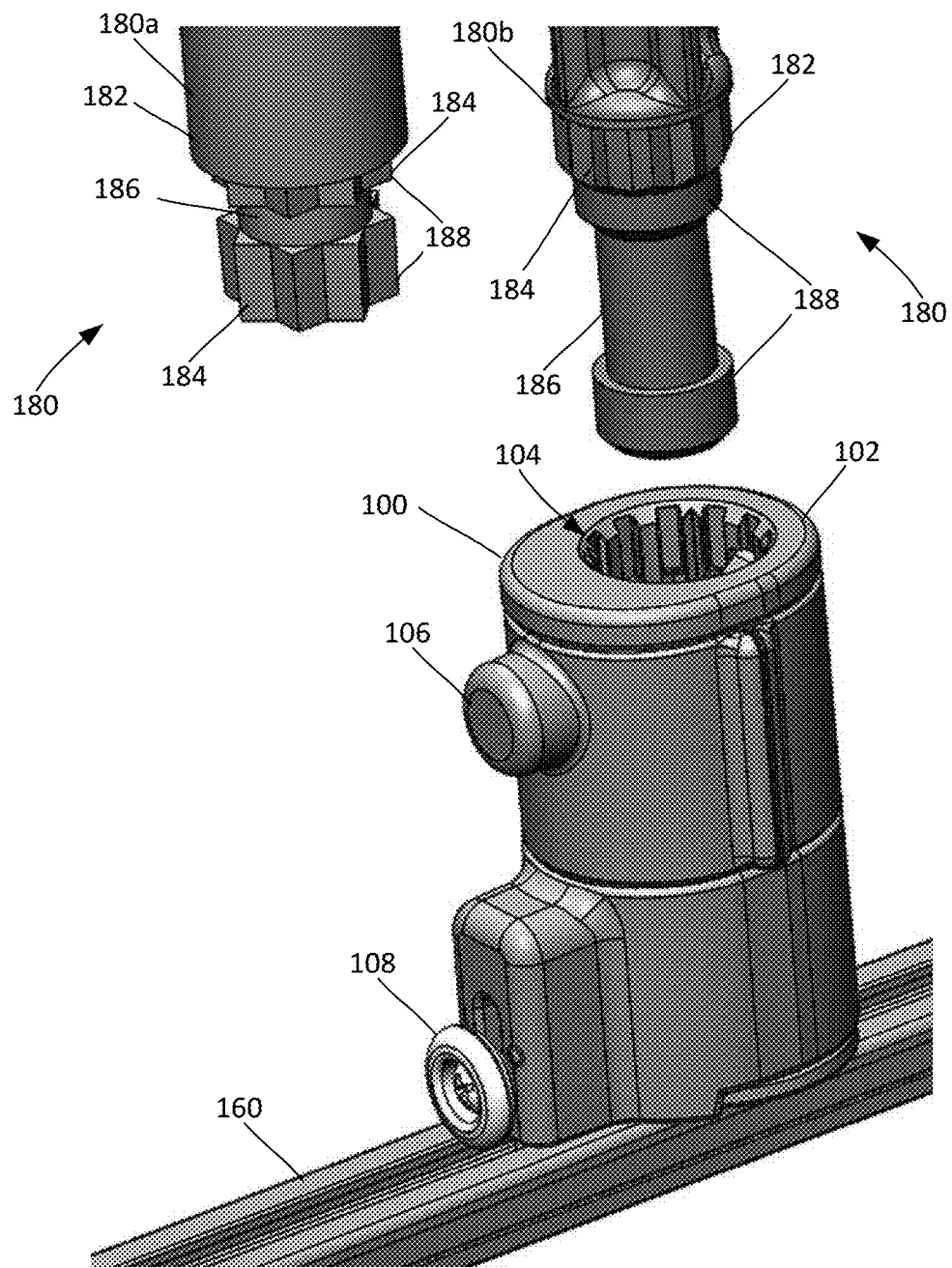
FIG. 2 is a schematic perspective view of the adapter of FIG. 1 coupled to a track with the shafts of two devices for insertion into the adapter, according to the invention.

As illustrated in FIG. 2, the housing 102 includes a shaft receiving port 104 for receiving a shaft 182 of the device 180 to be coupled to the adapter 100. In at least some embodiments, the shaft receiving port 104 is generally cylindrical, although other non-cylindrical configurations can be used. FIG. 2 illustrates the shafts 182 of two different devices 180a, 180b. Each of the shafts 182 includes a different arrangement of splines 184 disposed around the shaft. Different devices can have different arrangements of splines 184 as, for example, different device manufacturers may utilize different spline arrangements on the devices that they manufacture. The shafts 182 can also include at least one reduced diameter region 186 that is flanked on both sides by larger diameter regions 188. In some embodiments, the reduced diameter region 186 is isodiametric. In at least some embodiments, at least one of the flanking larger diameter regions 188 includes splines 184. In at least some embodiments, at least one of the flanking larger diameter regions 188 is isodiametric.

Figure 3:
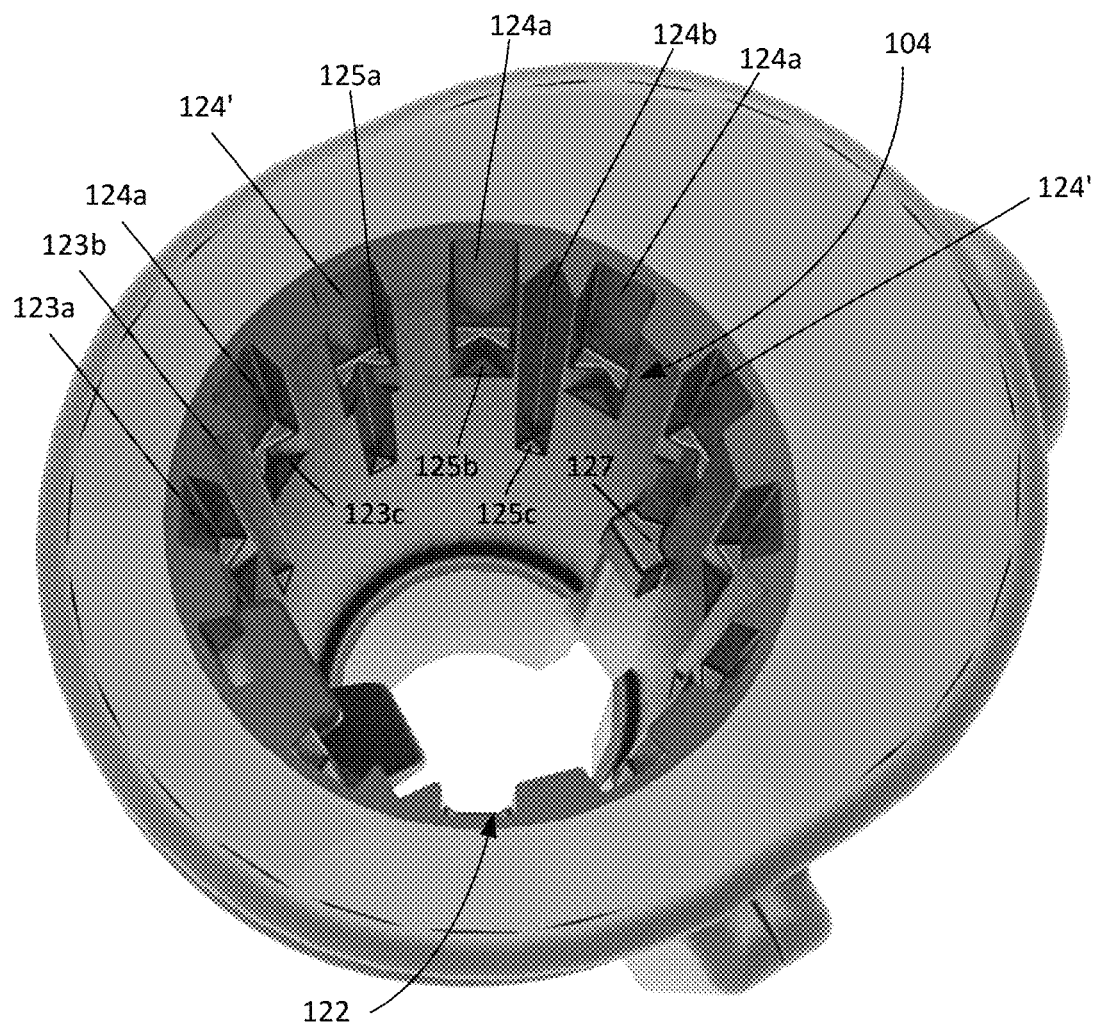
FIG. 3 is a schematic perspective top view of one embodiment of an adapter illustrating grooves in the shaft receiving port of the adapter, according to the invention.

The shaft receiving port 104 has an opening 122 and an arrangement of grooves 124 extending from the opening, as illustrated in FIG. 3. The arrangement of grooves 124 is selected to match one or more arrangements of splines 184 of one or more devices 180. In at least some embodiments, the arrangement of grooves 124 is designed to receive two, three, four or more different arrangements of splines 184. In at least some embodiments, the arrangement of grooves 124 includes a set of first grooves 124a and a set of second grooves 124b (and, optionally, a set of third grooves and so on.) The sets of first and second grooves 124a, 124b may overlap so that a particular groove 124' may be in both the set of first grooves 124a and the set of second grooves 124b. The set of first grooves 124a may be arranged to receive a device having a first pattern of splines and the set of second grooves 124b may be arranged to receive a device having a second pattern of splines (and so on for a set of third grooves, etc.) For example, in the illustrated embodiment of FIG. 3, a first set of grooves 124a includes twelve grooves spaced uniformly around the shaft receiving port 104 and the set of second grooves 124b can include eight grooves spaced uniformly around the shaft receiving port. In this embodiment, four of the grooves 124' are in both the set of first grooves 124a and the set of second grooves 124b.

The grooves 124 of each set may be disposed in a regular arrangement or irregular (for example, different spacing between adjacent grooves) around the shaft receiving port 104. In at least some embodiments, the grooves 124 originate at the opening 122 of the shaft receiving port 104 and terminate at some distance along the shaft receiving port. In other embodiments, the grooves 124 may originate at a position spaced apart from the opening 122 of the shaft receiving port 104.

In at least some embodiments, at least one of the first grooves 124a has a different shape than at least one of the second grooves 124b. For example, the shapes of the grooves 124 may differ in cross-sectional shape, length of the groove from the opening 122, width of the groove, depth of the groove into the housing 102, the presence and position of one or more stops within the groove, variation in the cross-sectional shape of the groove along its length, or the like or any combination thereof. Examples of many of these differences are found in the embodiment illustrated in FIG. 3 as described in more detail below. It will be recognized, however, that any groove 124 that is in both the set of first grooves 124a and the set of second grooves 124b will typically have a shape that accommodates both the first pattern of splines and the second pattern of splines and, therefore, may have shape characteristics that are in common with other first grooves 124a or second grooves 124b.

The illustrated embodiment of FIG. 3 is designed to receive at least three different patterns of splines 184. The first grooves 124a are designed to receive two different patterns of splines and the second grooves 124b are designed to receive a third pattern of splines. Those grooves 124' that are in both the set of first grooves 124a and the set of second grooves 124b are designed to receive splines 184 from all three patterns.

In the illustrated embodiment of FIG. 3, at least some of the first grooves 124a have a rectangular cross-section 123a (with one side open) at the opening 122 and at least some of the second grooves 124b have a first triangular cross-section 123b (with one side open). The first grooves 124a in FIG. 3 also include a first stop 125a where the rectangular cross-section terminates and a second stop 125b with a second triangular cross-section 123c (with one side open) that extends between the first and second stops 125a, 125b. The grooves 124' are similar to other first grooves 124a except that the grooves 124' also have the first triangular cross-section 123b (of the second grooves 124b) that extends from the second stop 125b to a third stop 125c. The second grooves 125b maintain the first triangular cross-section 123b from the opening 122 to the third stop 125c.

In the illustrated embodiment, the second grooves 124b extend further from the opening 122 than the first grooves 124a (except those grooves 124' that are in both the set of first grooves 124a and the set of second grooves 124b).

The features of the grooves 124a, 124b, 124' can correspond to features of the three different patterns of splines— for example, a first pattern of twelve splines having a rectangular cross-section or the like and the shortest length, a second pattern of twelve splines having a triangular cross-section and an intermediate length, and a third pattern of eight splines having a triangular cross-section with the longest length.

The shaft receiving port 104 may also include an alignment tab 127 that can correspond to an alignment feature (for example, an indent in one of the larger diameter regions 188) to provide a particular alignment of the shaft 182 of the device 180 with the adapter 100.

In at least some embodiments (see, for example, FIGS. 1A and 1D to 1G), the adapter 100 also includes a shaft locking mechanism 106 to lock the shaft 184 of the device 180 in the shaft receiving port 104, as illustrated in FIGS. 4A to 4D. The shaft locking mechanism 106 includes a lock housing 126, an actuator 128 (such as a push actuator, as illustrated in FIG. 1, or any exposed portion of the lock housing) defined by the lock housing 126, and a shaft engagement member 130 defined by the lock housing 126.

Figure 4A:
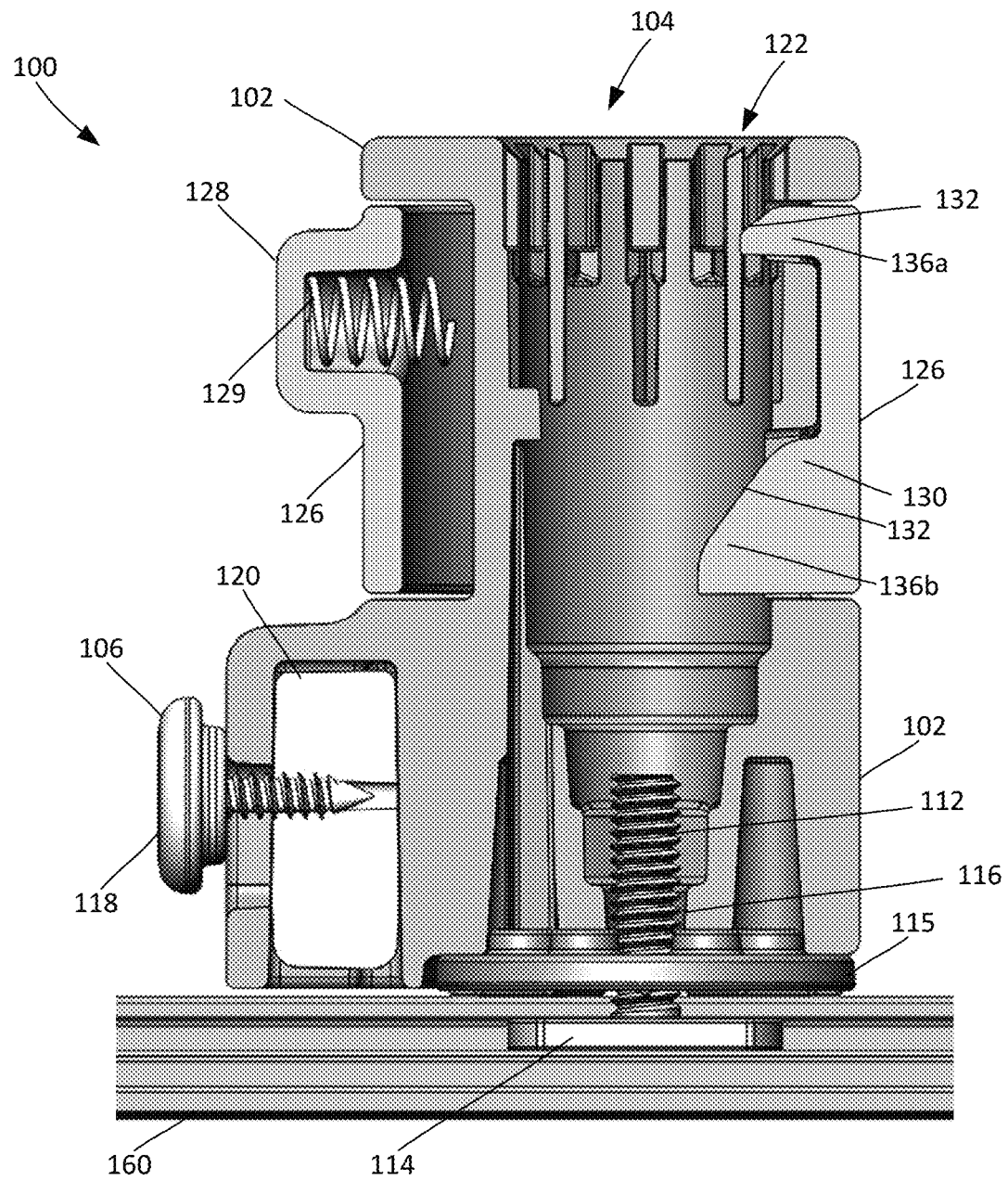
FIG. 4A is a schematic longitudinal cross-sectional view of one embodiment of an adapter with the shaft locking mechanism in the locked position and a track locking mechanism in the retracted position, according to the invention.
Figure 4B:
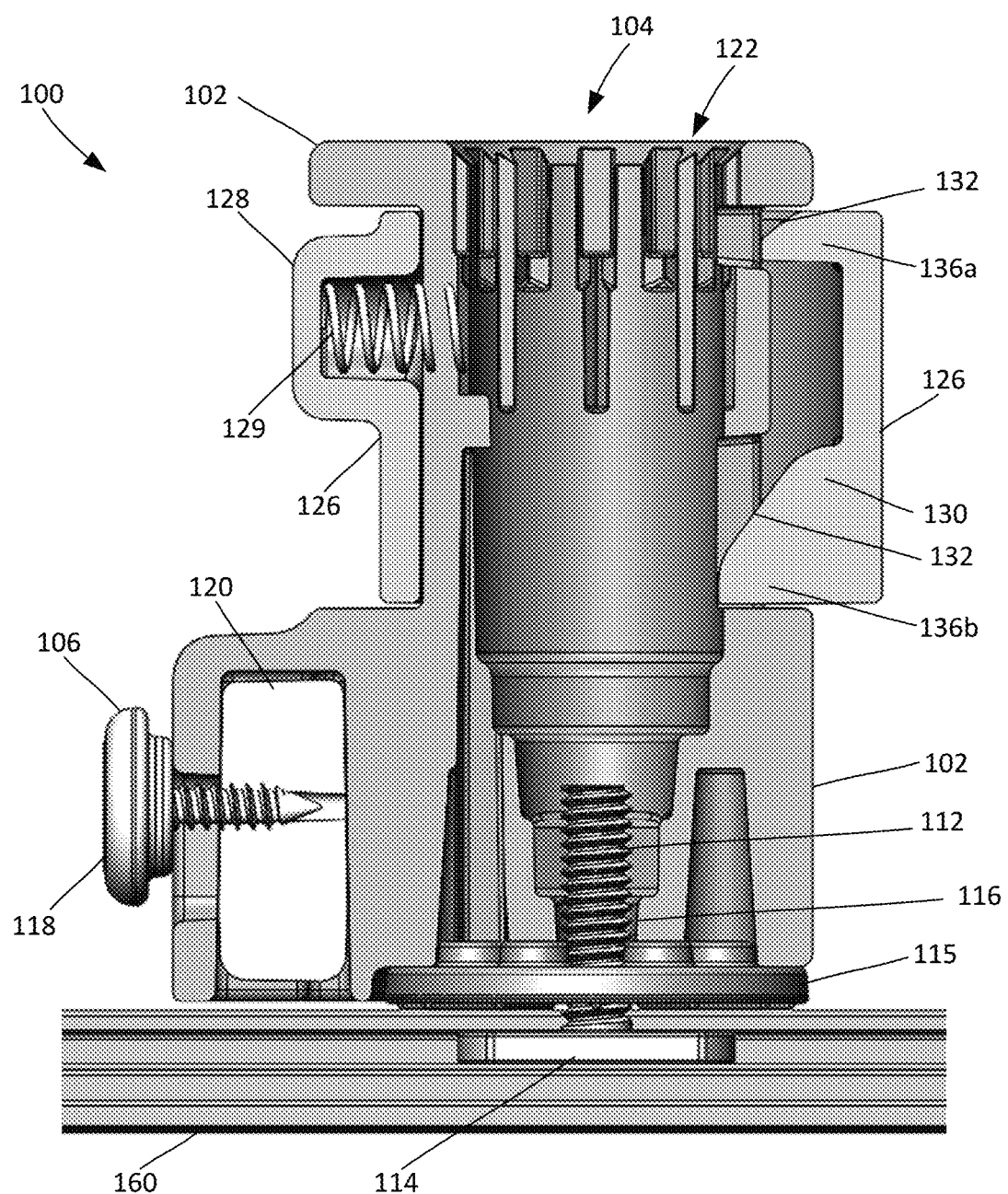
FIG. 4B is a schematic longitudinal cross-sectional view of the adapter of FIG. 4A with the shaft locking mechanism in the disengaged position, according to the invention.
Figure 4C:
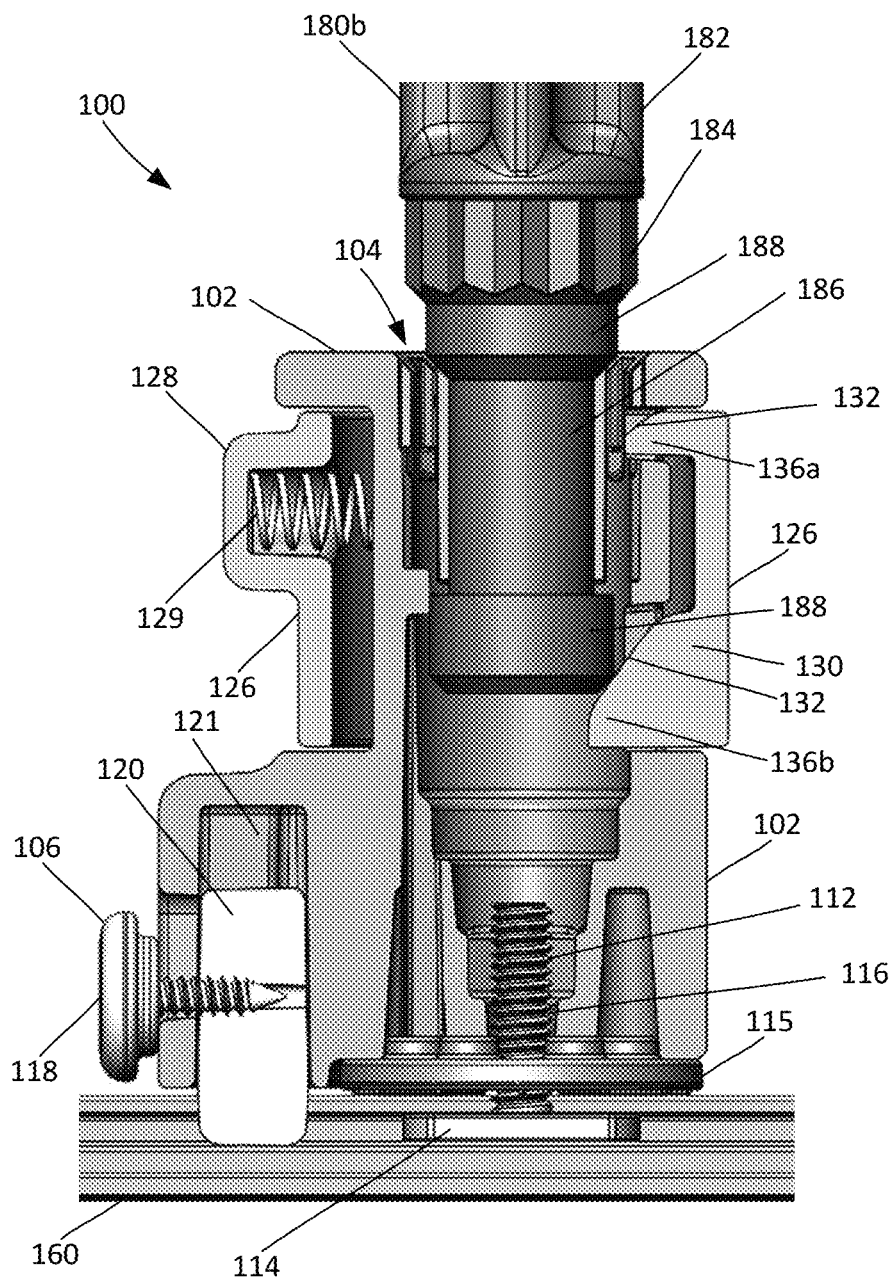
FIG. 4C is a schematic longitudinal cross-sectional view of the adapter of FIG. 4A with a shaft partially inserted into the shaft receiving port and the track locking mechanism in the deployed position, according to the invention.
Figure 4D:
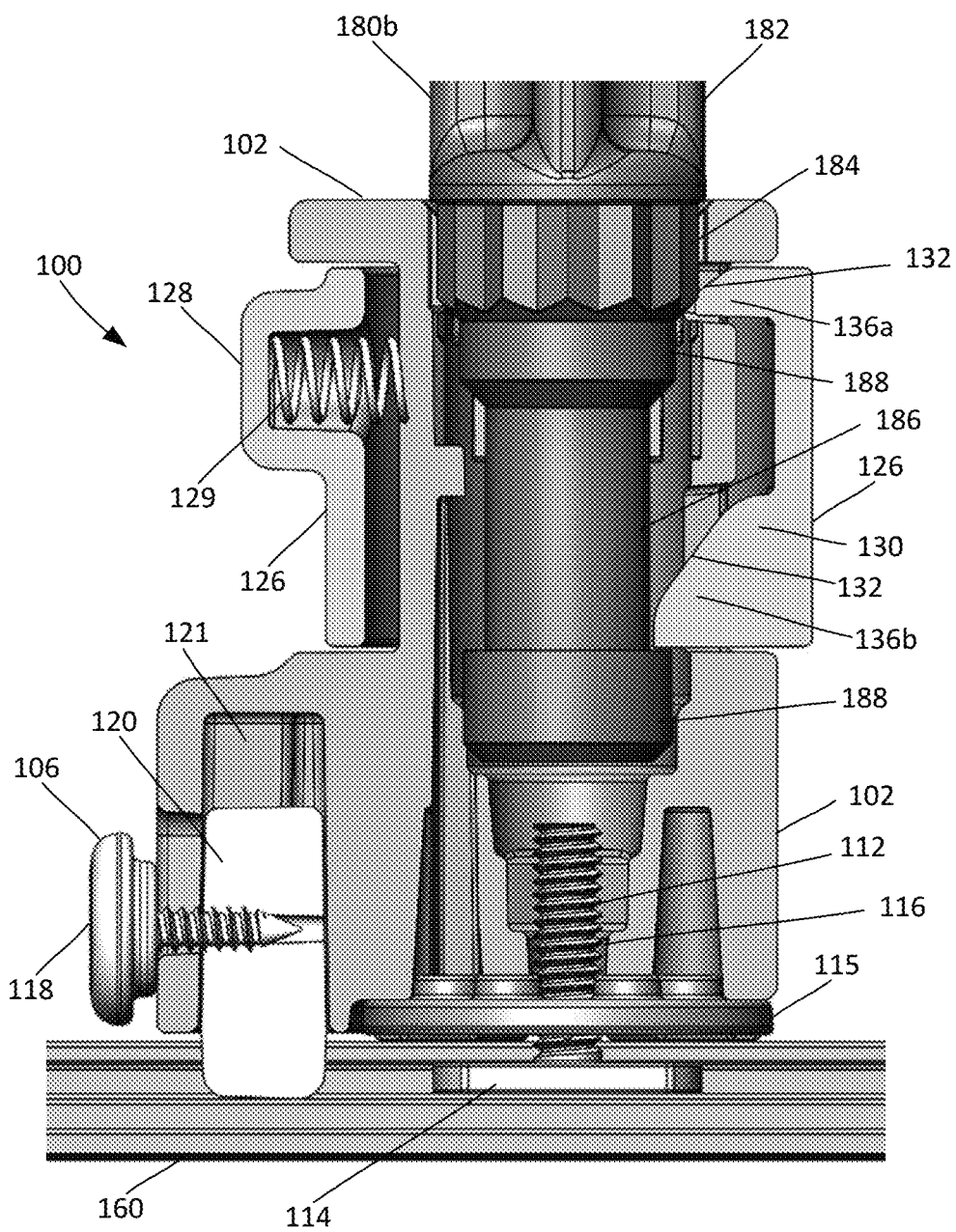
FIG. 4D is a schematic longitudinal cross-sectional view of the adapter of FIG. 4A a shaft fully inserted into the shaft receiving port and the track locking mechanism in the deployed position, according to the invention.

Optionally, the shaft locking mechanism also includes a biasing member 129 (for example, a compression spring, a leaf spring, any other suitable type of spring, or a cantilever) disposed between the lock housing 126 and the housing 102 and biasing the lock housing 126 and push actuator 128 in a locked position (see, for example, FIGS. 4A and 4D). The adapter 100 is described below using a shaft locking mechanism with a biasing member, but it will be understood that non-biasing shaft locking mechanism can be used. For example, the lock housing 126 of a non-biasing shaft locking mechanism 106 can be manually moved (for example, pushed or pulled) between the locked position and a disengaged position. There may be a feature, such as a snap feature, frictional feature, or compression feature, which is engaged in both (or only one of) the locked position and the disengaged position to retain the lock housing 126 in that position until the user manually moves the lock housing to the other position.

In the illustrated embodiment of FIGS. 4A to 4D, the shaft engagement member 130 includes two arms 136a, 136b. It will be recognized that other embodiments of the shaft engagement member 130 can include one, three, four or more arms. The number and arrangement of arms may depend on the number of different shaft arrangements that the adapter 100 is designed to receive. The longitudinal position (relative to the opening 122 of the shaft receiving port 104), size, and shape of the arm 136a, 136b and the distance that the arm extends into the shaft receiving port 104 in the locked position may depend on the shaft arrangement that the arm is designed to engage. As illustrated in FIGS. 4A to 4D, the arms 136a, 136b have different longitudinal positions, shapes, and sizes and extend different distances into the shaft receiving port 104.

In the illustrated embodiment of FIGS. 4A to 4D, one arm 136a is nearer the opening 122 of the shaft receiving port 104 and is designed to engage the shaft 184 of a first type of device 180a (FIG. 2). The other arm 136b is further away from the opening 122 of the shaft receiving port 104 and is designed to engage the shaft of a second type of device 180b (FIG. 2), as illustrated in FIG. 4D.

In the locked position, as illustrated in FIG. 4D, the shaft engagement member 130 engages the shaft 184 of the device 180 to hold the shaft within the shaft receiving port 104 and resist removal of the shaft. In the illustrated embodiment, the arm 136b extends toward the reduced diameter portion 186 of the shaft 182 of the device 180*b* and the arm 136*b* acts as a stop relative to a larger diameter region 188 of the shaft to hinder or prevent removal of the shaft from the adapter 100 when the shaft locking mechanism 106 is in the locked position. Similarly, the arm 136*a* will engage the shaft 174 of the device 180*a* and extend toward the reduce diameter portion of the shaft 182 of the device 180*a* and act as a stop relative to a larger diameter region 188 of the shaft.

When the push actuator 128 is manually pushed toward the housing 102 to a disengaged position (see, FIG. 4B), the shaft engagement member 130 disengages from the shaft 184 to allow the shaft to be removed from the shaft receiving port 104. The push actuator 128 may also be manually pushed to the disengaged position to facilitate insertion of the shaft 184 into the shaft receiving port 104, as illustrated in FIG. 4B.

Optionally, the shaft engagement member 130 can have one or more sloped surfaces 132 (sloped downward away from the opening 122 of the shaft receiving port 104) which, when the shaft 184 is inserted into the shaft receiving port 104, allow the shaft to push against the shaft engagement member 130 and move the shaft engagement member 130 toward the disengaged position without pushing on the push actuator 126, as illustrated in FIG. 4C. In this manner, the shaft 184 can be inserted into the shaft receiving port 104 without manual operation of the push actuator 126. Other surfaces 134 of the shaft engagement member 130 can be flat or sloped upward toward the opening 122 of the shaft receiving port 104 to act as a stop to the removal of the shaft 184 from the shaft receiving port 104 unless the push actuator 126 is pushed to the disengaged position.

Figure 5:
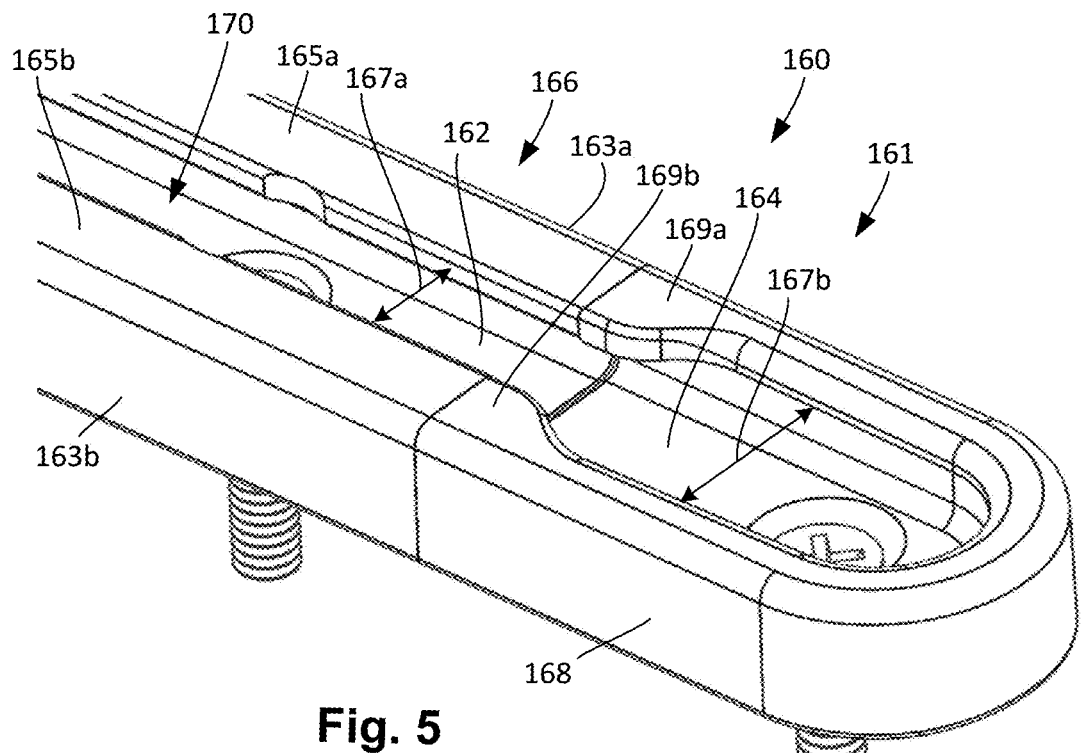
FIG. 5 is a schematic perspective view of one embodiment of a track.

Some embodiments of the adapter 100 are configured to couple to a track 160. FIG. 1A illustrates one embodiment of a track 160. FIG. 5 illustrates another embodiment of a track 160 that can be used with the adapter 100. It will be recognized, however, that other types of tracks can be used. In addition, non-limiting examples of other tracks are presented in U.S. Pat. Nos. 10,155,306; 10,378,690; 10,429,002; and 10,527,219, all of which are incorporated herein by reference in their entireties.

FIG. 5 shows, in schematic perspective view, one embodiment of a portion of the track 160 that includes an endpiece 161 attached to a portion of a track section 166. The track section 166 includes a track base 162 and two vertical track rails 163*a*, 163*b* extending opposite each other from the track base 162. Two horizontal track beams 165*a*, 165*b* extend from the vertical track rails 163*a*, 163*b*, respectively, over the track base 162 towards each other. The horizontal track beams 165*a*, 165*b* are laterally spaced apart from each other by a first distance 167*a*.

The endpiece 161 includes an endpiece base 164 and a vertical endpiece rail 168 extending from the endpiece base 164 and forming a perimeter around a portion of the endpiece base 164. Two horizontal endpiece beams 169*a*, 169*b* extend from the vertical endpiece rail 168 over the endpiece base 164 towards each other. In at least some embodiments, the endpiece 161 forms an insertion zone 171 where the two horizontal endpiece beams 169*a*, 169*b* are spaced apart from each other by a second distance 167*b* that is larger than the first distance 167*a* to facilitate insertion of a portion of the adapter 100 into the track channel 170 of the track 160. In at least some tracks, in addition to or instead of an endpiece 161 with an insertion zone 171, non-endpiece portions of the track 160 can include an insertion zone.

When the endpiece 161 is coupled to the track section 166, the track base 162 and the endpiece base 164 align; the vertical track rails 163*a*, 163*b* and the vertical endpiece rail 168 align; and the horizontal track beams 165*a*, 165*b* and the horizontal endpiece beams 169*a*, 169*b*, respectively, align to form a track channel 170 of the track 260. In at least some embodiments, the track 160 is closed at one end by at least the vertical endpiece rail 168. In other embodiments, such as illustrated in FIG. 1A, a track 160 can be open at one end to facilitate insertion of a portion of the adapter into the track 160 and does not necessarily include an endpiece 161. In at least some embodiments, the track 160 does not include an insertion zone 171, but the adapter can be coupled to the track 160 by insertion of a portion of the adapter into an open end of the track or by insertion through the separation between the horizontal track beams 165*a*, 165*b* as described, for example, in U.S. Pat. No. 10,429,002, which is incorporated herein by reference in its entirety. Other arrangements of pieces for a track are disclosed in U.S. Pat. Nos. 10,155,306; 10,429,002; and 10,527,219, all of which are incorporated herein by reference in their entireties.

Figure 6:
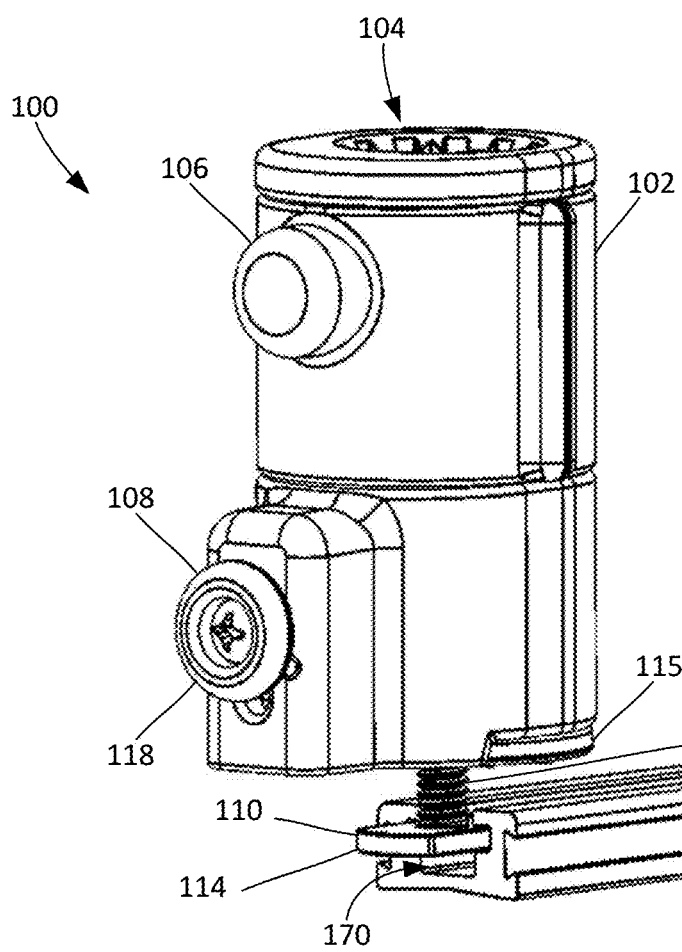
FIG. 6 is schematic perspective view of one embodiment of an adapter being inserted into a track, according to the invention.

FIG. 6 illustrates one embodiment of the adapter 100 with a track retention arrangement 110 extending from the housing 102 and illustrates one method for coupling the adapter to the track 160. Other adapters 100 may not include a track retention arrangement 110 if designed to couple to other surfaces or the like. The track retention arrangement 110 of FIG. 6 includes a threaded post 112, a foot 114 attached to the threaded post and configured to fit into a track channel 170 of the track 160, and a base 115 rotatably attached to the threaded post. The threaded post 112 engages a threaded port 116 (FIGS. 7A and 7B) defined by the housing 102.

The foot 114 can have any suitable shape. For example, in the illustrated embodiment, the foot 114 has an elongated shape with a length in one dimension longer than a length in another dimension. For example, the elongated shape can be rectangular which can optionally include rounded corners. Other shapes include, but are not limited to, square (with or without rounded corners), circular, triangular (for example, equilateral or isosceles), oval, or the like. In at least some embodiments, the foot 114 can have a shape that fits relatively snugly within the track channel 170. For example, the foot 114 may be dimensioned so that the foot cannot rotate more then 10, 15, or 20 degrees within the track channel 170 or the foot has a lateral width that is no more than 5, 10, 15, or 20 percent less than the corresponding lateral width of the track channel.

In at least some embodiments, rotation of the housing 102 relative to the threaded post 112 (or rotation of the threaded post 112 relative to the housing 102) raises or lowers the foot 114 relative to the housing. For example, after inserting the foot 114 into the track channel 170 of the track 160, the housing 102 can be rotated to raise the foot 114. In at least some embodiments, the foot 114 is raised until the foot engages the horizontal rails 165*a*, 165*b* of the track 160. The engagement of the foot 114 and the horizontal rails 165*a*, 165*b* of the track 160 facilitates retention of the adapter 100 on the track 160. In at least some embodiments, the rotation also rotates the foot 114 so that it is not aligned with the opening between the horizontal rails 165*a*, 165*b* of the track 160.

To remove the adapter from the track 160, the housing 102 is rotated to lower the foot 114 to disengage the foot from the horizontal rails 165*a*, 165*b* of the track 160. The foot 114 can then be removed from the track channel 170 of the track 160 by any suitable method.

In at least some embodiments, the base 115 acts like a washer between the housing 102 and the track 160. In at least some embodiments, the base 115 provides a stable contact surface for the track 160. In at least some embodiments, the base 115 can rotate relative to the housing 102. Rotation of the housing 102 relative to the threaded post 112 can also tighten or loosen the contact that the base 115 has with the track 160 as the foot 114 is lowered or raised, respectively.

In at least some embodiments, the adapter 100 also includes a locking mechanism 108 that can be manually actuated to further hinder the adapter from being removed from the track 160. This locking mechanism may be particularly useful for instances in which the adapter 100 may be subject to vibration or torque that may dislodge the engagement of the foot 114 and the horizontal rails 165a, 165b of the track 160.

Figure 7A:
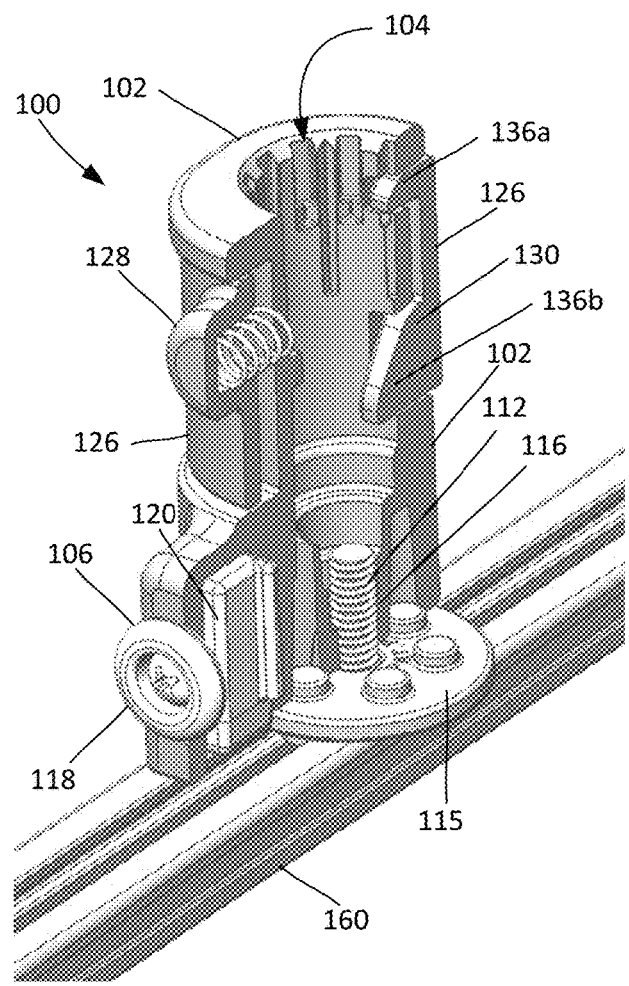
FIG. 7A is a schematic perspective longitudinal cross-sectional view of one embodiment of an adapter with the shaft locking mechanism in the locked position and a track locking mechanism in the retracted position, according to the invention.
Figure 7B:
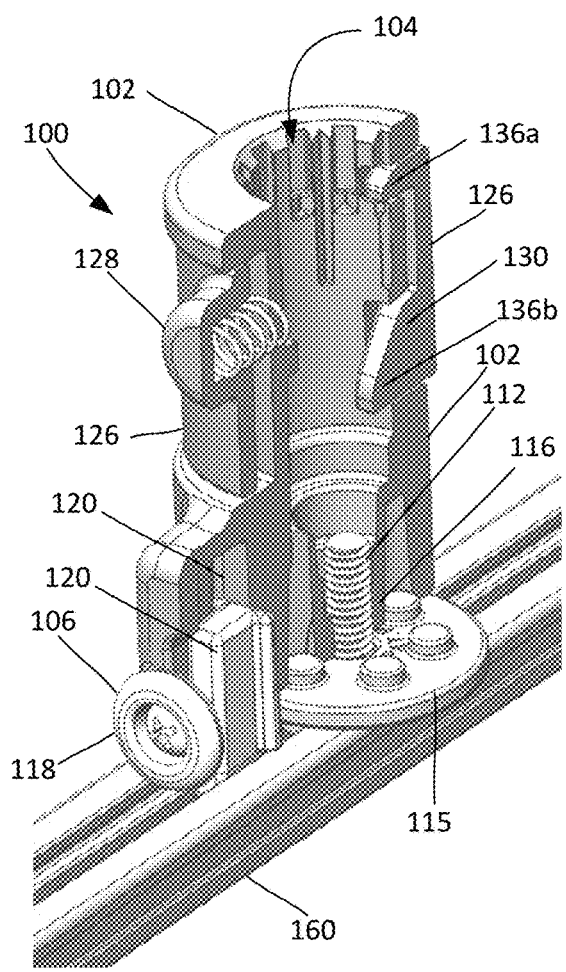
FIG. 7B is a schematic perspective longitudinal cross-sectional view of the adapter of FIG. 4A with the track locking mechanism in the deployed position, according to the invention.

In at least some embodiments, the locking mechanism 108 includes an actuator 118 and a plunger 120 attached to the actuator, as illustrated in FIGS. 7A and 7B. The actuator 118 allows a user to move the plunger 120 between a retracted position (see, FIG. 7A) and a deployed position (see, FIG. 7B). In at least some embodiments, the actuator 118 is moveably mounted on the housing 102 and the plunger 120 is at least partially disposed in the housing. In at least some embodiments, the plunger 120 is at least partially disposed in a plunger storage space 121 in the housing. In at least some embodiments, the actuator 118 can be attached to the plunger 120 using a screw, bolt, adhesive or the like or any other fastener or fastening mechanism or the actuator and plunger can be a single unitary piece.

In the retracted position, the plunger 120 is retracted into the housing 102, although in some embodiments a small portion of the plunger may extend out of the housing. In the deployed position, the plunger 120 extends out of the housing 102 and, when the adapter is coupled to a track 160, into the track channel 170 of the track. By extending into the track channel 170 of the track 160, the plunger 120 hinders or prevents rotation of the housing 102 relative to the foot 114 and so hinders or prevents the disengagement of the foot from the horizontal rails 165a, 165b of the track 160 or the disengagement of the adapter 100 from the track 160.

In at least some embodiments, the actuator 118 is attached to the plunger 120 and slides relative to the housing 102. In at least some embodiments, the actuator 118 is arranged, through the presence or friction, compression, or the like or any combination thereof, to require a user to apply force to slide the actuator 118 relative to the housing 102. In these embodiments, the actuator 118 does not freely slide relative to the housing 102, but rather requires user operation to cause the actuator 118 to slide and deploy or retract the plunger 120.

The plunger 120 can have any suitable cross-sectional shape. For example, in the illustrated embodiment, the plunger 120 has an elongated shape with a length in one dimension longer than a length in another dimension. For example, the elongated shape can be rectangular which can optionally include rounded corners. Other shapes include, but are not limited to, square (with or without rounded corners), circular, triangular (for example, equilateral or isosceles), oval, or the like. In at least some embodiments, the plunger 120 has a lateral width that is no more than 5, 10, 15, or 20 percent less than the first distance 167a between the horizontal track beams 165a, 165b (see, FIG. 5).

The above specification provides a description of the manufacture and use of the invention. Since many embodiments of the invention can be made without departing from the spirit and scope of the invention, the invention also resides in the claims hereinafter appended.

What is claimed is:

1. An adapter, comprising:
    a housing; and
    a shaft receiving port defined in the housing and having a first opening, wherein the shaft receiving port is compatible with a first shaft of a first device and a second shaft of a second device so that the shaft receiving port is configured to receive, through the first opening, either one of the first shaft of the first device or the second shaft of the second device, wherein the shaft receiving port defines a plurality of grooves arranged around the shaft receiving port and extending at least partway along the shaft receiving port, wherein the plurality of grooves comprises a set of first grooves extending from the first opening and a set of second grooves extending form the first opening, wherein at least one of the first grooves is different from at least one of the second grooves, wherein the first grooves are arranged to receive the first shaft that has a first pattern of splines disposed along the first shaft to fit into the first grooves and the second grooves are arranged to receive the second shaft that has a second pattern of splines along the second shaft to fit into the second grooves.

2. The adapter of claim 1, wherein the plurality of grooves comprises at least one groove that is one of the first grooves and also one of the second grooves.

3. The adapter of claim 1, wherein the at least one of the first grooves has a different cross-sectional shape from the at least one of the second grooves.

4. The adapter of claim 1, wherein the at least one of the first grooves extends a different distance along the shaft receiving port from the at least one of the second grooves.

5. The adapter of claim 1, wherein the number of first grooves is different from the number of second grooves.

6. The adapter of claim 1, wherein at least one of the first grooves has a first cross-sectional shape along a first portion of the least one of the first grooves and a second-cross-sectional shape, different from the first cross-sectional shape, along a second portion of the at least one of the first grooves.

7. The adapter of claim 1, wherein at least one of the first grooves comprises a first stop partway along a length of the at least one of the first grooves and a second stop at an end of the length of the at least one of the first grooves.

8. The adapter of claim 1, wherein the first grooves are disposed uniformly around a circumference of the shaft receiving port.

9. The adapter of claim 1, wherein the housing further defines a threaded port, the adapter further comprising:
    a track retention arrangement comprising a foot and a threaded post extending from the foot, wherein the threaded post is rotatably engaged with the threaded port of the housing to raise or lower the foot relative to the housing, wherein the foot is configured for insertion into a track channel of a track and, when rotated, to engage or disengage the track; and
    a track locking mechanism comprising an actuator and a plunger coupled to the actuator and configured, when deployed by operation of the actuator, to extend from the housing into the track channel of the track to engage a portion of the track channel and hinder rotation of the housing and raising or lowering of the foot of the track retention arrangement.

10. The adapter of claim 9, wherein the track locking mechanism further comprises a base disposed adjacent the housing and configured to clamp a portion of the track between the base and the foot when the adapter is coupled to the track.

11. An adapter, comprising:
a housing;
a shaft receiving port defined in the housing and having a first opening, wherein the shaft receiving port is compatible with a first shaft of a first device and a second shaft of a second device so that the shaft receiving port is configured to receive, through the first opening, either one of the first shaft of the first device or the second shaft of the second device, wherein the shaft receiving port defines a plurality of grooves arranged around the shaft receiving port and extending at least partway along the shaft receiving port, wherein the plurality of grooves comprises a set of first grooves and a set of second grooves, wherein at least one of the first grooves is different from at least one of the second grooves, wherein the first grooves are arranged to receive the first shaft that has a first pattern of splines disposed along the first shaft to fit into the first grooves and the second grooves are arranged to receive the second shaft that has a second pattern of splines along the second shaft to fit into the second grooves; and
a shaft locking mechanism comprising a lock housing, an actuator defined by the lock housing, and a shaft engagement member defined by the lock housing and configured to be movable using the actuator between a locked position and a disengaged position and to engage the first shaft or the second shaft when the first shaft or the second shaft is in the shaft receiving port and the shaft locking mechanism is in a locked position.

12. The adapter of claim 11, wherein the shaft engagement member comprises a plurality of arms disposed at different positions along the shaft receiving port.

13. The adapter of claim 12, wherein at least two of the arms differ in shape, size, or distance that the respective arm extends into the shaft receiving port when the shaft locking mechanism is in the locked position.

14. The adapter of claim 12, wherein at least one of the arms comprises a curved surface configured for the shaft to engage the curved surface as the shaft is inserted into the shaft receiving port and push the shaft locking mechanism to a disengaged position to continue insertion of the shaft.

15. The adapter of claim 11, wherein the housing further defines a threaded port, the adapter further comprising:
a track retention arrangement comprising a foot and a threaded post extending from the foot, wherein the threaded post is rotatably engaged with the threaded port of the housing to raise or lower the foot relative to the housing, wherein the foot is configured for insertion into a track channel of a track and, when rotated, to engage or disengage the track; and
a track locking mechanism comprising an actuator and a plunger coupled to the actuator and configured, when deployed by operation of the actuator, to extend from the housing into the track channel of the track to engage a portion of the track channel and hinder rotation of the housing and raising or lowering of the foot of the track retention arrangement.

16. The adapter of claim 15, wherein the track locking mechanism further comprises a base disposed adjacent the housing and configured to clamp a portion of the track between the base and the foot when the adapter is coupled to the track.

17. The adapter of claim 11, wherein the plurality of grooves comprises at least one groove that is one of the first grooves and also one of the second grooves.

18. The adapter of claim 11, wherein the at least one of the first grooves has a different cross-sectional shape from the at least one of the second grooves.

19. The adapter of claim 11, wherein the at least one of the first grooves extends a different distance along the shaft receiving port from the at least one of the second grooves.

20. The adapter of claim 11, wherein at least one of the first grooves has a first cross-sectional shape along a first portion of the least one of the first grooves and a second-cross-sectional shape, different from the first cross-sectional shape, along a second portion of the at least one of the first grooves.

* * * * *